Figure 1:
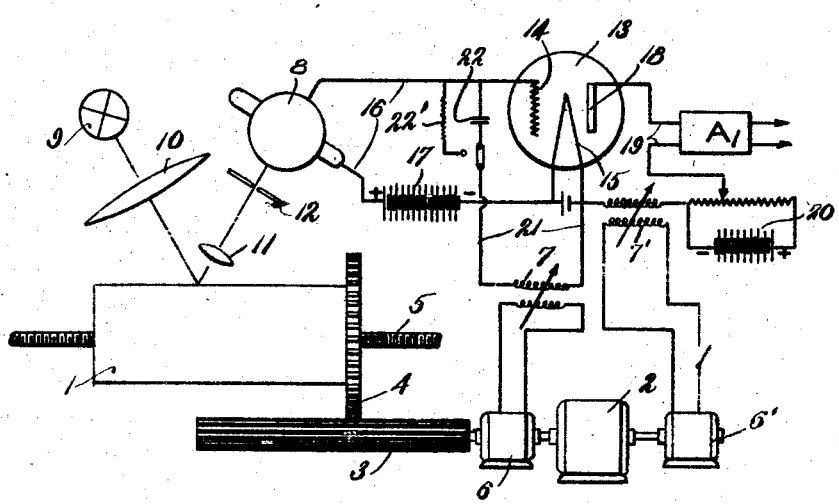

Oct. 1, 1935.  A. G. COOLEY  2,015,742

SYNCHRONIZING APPARATUS FOR PHOTOTELEGRAPHY, ETC

Filed Dec. 11, 1924

Inventor:
Austin G. Cooley,
by Roberts, Roberts & Cushman,
Attys.

Patented Oct. 1, 1935

2,015,742

UNITED STATES PATENT OFFICE 2,015,742

SYNCHRONIZING APPARATUS FOR PHOTOTELEGRAPHY, ETC.

Austin G. Cooley, Cambridge, Mass., assignor, by mesne assignments, to Radio Corporation of America, a corporation of Delaware Application December 11, 1924, Serial No. 755,336

11 Claims. (Cl. 178—69.5)

This invention relates to photo-telegraphic apparatus of the type wherein the light values of the subject-matter affect the transmitted power so that the light values are reproduced at the receiving station in corresponding time and space relation, and particularly to apparatus for synchronizing the transmitting and receiving units such as, for example, rotating carriers for the photographic or printed matter to be transmitted and received.

In one aspect the invention comprises apparatus for sending with alternating or other varying current, the transmitter being driven at a rate proportional to a power frequency, and the subject-matter being transmitted by varying the amplitude of the aforesaid current or power; and apparatus for operating the receiver apparatus at a speed proportional to the frequency of said current or power together with means for applying driving forces to the receiver independently of the transmitted power.

In a more specific aspect the invention comprises apparatus for sending with alternating or other pulsating current, the transmitting carrier or transmitter being driven by the source of the current energy or otherwise at a rate proportional to the frequency of the current and the subject matter being transmitted by varying the pulsating current, apparatus for driving the receiving carrier or receiver at a speed proportional to said frequency and therefore in synchronism with the transmitting carrier, motive means for applying driving force to the receiver independently of the pulsating transmitting current, and regulating means responsive to the impulses of said pulsating current for synchronizing the receivers with the current frequency and therefore with the transmitter. Said motive means, which may be an electric motor or other motor, preferably applies to the receiving carrier an approximately constant driving force sufficient to overcome its average resistance, and said regulating means therefore requires only a small amount of energy to synchronize the carrier. When the regulating means is in the form of a coil inductively associated with the rotor of said motor or with an associated rotor it functions as motive means to apply advancing force when the receiver tends to lag and to apply retarding force when the receiver tends to move too fast, the coil deriving its energy from said pulsating transmitting current or current controlled thereby.

For the purpose of illustration one concrete embodiment of the genus of the invention is shown diagrammatically, in the accompanying drawing in which:—

Fig. 1 indicates the transmitting apparatus; and

Figure 2:
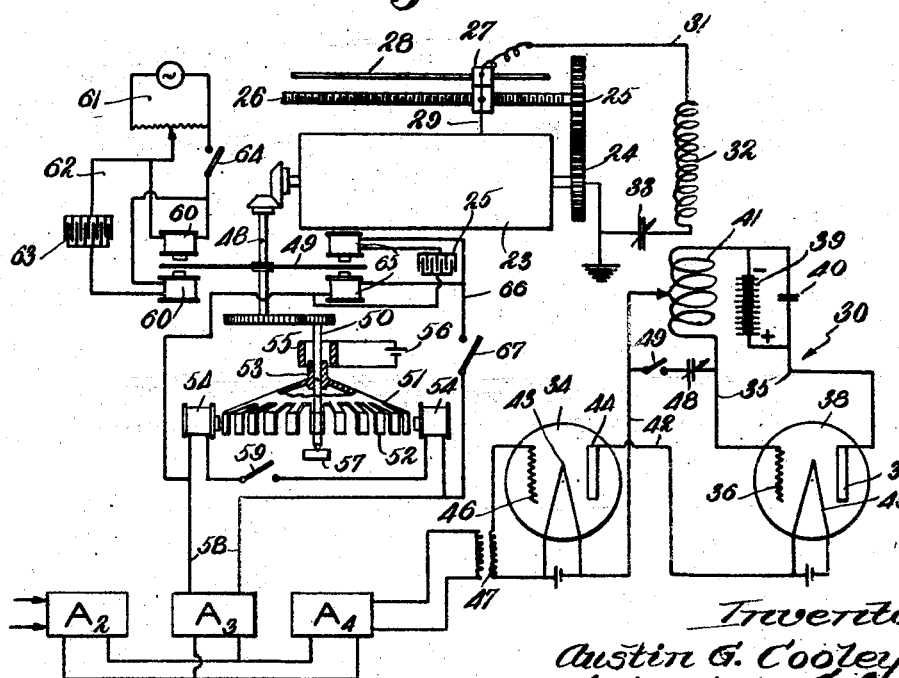

Fig. 2 indicates the receiving apparatus.

In the particular embodiment of the invention chosen for the purpose of illustration the transmitting apparatus comprises a drum 1 upon which the photograph, printed matter or the like, is wrapped, a motor 2 for rotating the drum through gears 3 and 4, the drum threading axially on a stationary shaft 5 as it rotates, a generator 6 for supplying alternating current to variable transformer 7 at a suitable frequency (say 1000 cycles or higher) which is proportional to the speed of drum 1, a photo-electric cell 8, a light source 9, lenses 10 and 11 for focusing upon said cell through apertured plate 12 a pencil of light reflected from the photograph or the like, an audion 13 having its grid 14 and cathode 15 connected to said cell through an input circuit 16 containing a source of potential 17, and having its cathode and anode 18 connected to an output circuit 19 containing a variable source 20, and an amplifier $A_1$ interposed in the output circuit. This amplifier, as well as the amplifiers hereinafter referred to, may be of audion or other suitable type. The transformer 7 is connected across the input circuit 16 by circuit 21 containing a low capacity (e. g. 0.00001 m. f.) condenser 22, or high resistance 22', (e. g. of the order of five to twenty-five megohms, preferably the latter, depending on the type of audion, etc.).

The receiving apparatus shown in Fig. 2 comprises a drum 23 which rotates without endwise progression, this drum carrying sensitized paper or other suitable recording media. Connected to the drum through gears 24 and 25 is a threaded shaft 26 along which travels a head 27, the head having an opening to receive stationary rod 28 which restrains the head from turning with the shaft. Head 27 carries a needle 29 for directing an electronic discharge to the sheet wound on drum 23. This discharge is produced by an oscillating circuit 30 feeding into circuit 31 containing coil 32 and condenser 33, the oscillating circuit being controlled by the aforesaid transmitting station working through amplifiers $A_2$ and $A_4$ and a modulator 34.

The oscillator comprises a circuit 35 connected to the grid 36 and anode 37 of audion 38 and containing battery 39, condenser 40 and coil 41, the latter being inductively associated with coil 32. The output circuit 42 from the cathode 43 and anode 44 of modulator 34 is connected between the coil 41 and cathode 45 of audion 38, the grid 46 of the modulator being connected to amplifier A4, through transformer 47. A condenser 48 may be connected in the circuits by switch 49 but is ordinarily not required.

Geared to the drum 23 is a shaft 48 carrying a conducting disk 49 and geared to shaft 48 is a shaft 50 carrying a conical rotor 51 of paramagnetic material, the rotor having peripheral poles 52 and an axial stem 53 fast to shaft 50. Stationary coils 54 and 55 are associated with the poles 52 and stem 53 respectively, the coil 55 being energized by battery 56 to polarize poles 52 and also to pull upwardly on stem 53 thereby to cause the shaft 50 to rest lightly on bearing 57. The coils 54 are connected to amplifier A3 through circuit 58 containing switch 59. Associated with disk 49 are electro-magnets 60 connected to a variable source of alternating current 61 through circuit 62 containing condenser 63 to throw magnets 60 out of phase with each other and switch 64. The circuit 58 may also be connected to electro-magnets associated with disk 49 and in the drawing this circuit is connected to electro-magnets 65 other than magnets 60 through circuit 66 containing switch 67, a condenser 75 being connected in series with one of the electro-magnets 65 to produce the necessary phase displacement.

In transmitting, motor 2 drives the drum 1 at a speed proportional to the frequency of the alternating current from generator 6 and the light from source 9 traces a spiral around the periphery of the drum as the latter is threaded along shaft 5. The alternating current from generator 6, acting upon the grid of audion 13, causes pulsations or impulses to be transmitted from the transmitting station to the receiving station, either by wire or by radio. The light reflected from the subject-matter on drum 1 to the photo-electric cell varies the resistance of circuit 16 in accordance with variations in the reflection ability of the successive points of the subject-matter. This variation of resistance in circuit 16 varies the potential on grid 14 and thereby varies the aforesaid impulses.

It has been found that by varying the potential of battery 20 either like or opposite reproduction can be effected, that is, either a positive or a negative can be produced at the receiving station when using a negative (or a positive) at the transmitting station. For example, like reproduction has been attained with twenty volts and opposite reproduction with ten volts. This is due to the fact that under the respective conditions opposite effects are produced by the pulsating potential impressed upon grid 14 by transformer 7 when the plate potential is varied. A theory explanatory of this mode of operation is set forth in co-pending application Serial No. 755,337, filed on even date herewith, in which application this method of like or opposite reproduction is claimed.

At the receiving station said varying impulses vary the potential on grid 46 thereby varying the effective resistance of circuit 42 and varying the intensity of the oscillations in circuit 30. When no impulse is acting upon grid 46 the resistance of the modulator is sufficient to prevent oscillations or at least render the oscillations so feeble as to be ineffective. When an impulse is acting upon grid 46 the resistance is lowered sufficiently to permit oscillations, the intensity of the oscillations being proportional to the intensity of the impulse. The oscillating circuit 30 is preferably adjusted to generate oscillations of high-frequency and high-potential adapted to produce an electronic discharge (e. g. a corona discharge) from needle 29 when above a predetermined intensity higher than that existing between successive impulses, the intensity of the discharge depending upon the excess of oscillation intensity above the predetermined intensity, whereby an electronic discharge is emitted from needle 29 during each impulse (except perhaps while recording a white or an extremely light representation on the receiving paper). Thus, in transmitting a half-tone, a dot (or short dash) is recorded on the receiving paper at each impulse, the dot varying in intensity in response to variations in the intensity of said impulses, and in transmitting extreme contrasts such as the black and white of printed matter, at each impulse during passage of black or white (depending upon the adjustment of the transmitting apparatus as above described) past the point of incidence of the light from source 9.

The recording paper may be of the type requiring development subsequent to exposure by the electronic discharge to convert the latent image into a patent image or it may be of the type in which a patent image is produced without development, the latter type having the advantage of displaying the image as it is recorded. The electronic discharge produces the exposure as a result of its light and/or heat and/or electronic bombardment of the photographic emulsion.

The receiving drum 23 is driven at approximately the speed of the transmitting drum 1 by the eddy-current motor comprising disk 49, the current in coils 60 being adjusted to such quantity and phase relation as to overcome the average resistance of the parts driven thereby, and the aforesaid impulses of current synchronize the drum 23 with drum 1 by recurrently energizing magnets 54 at the frequency of the transmitting current. The poles 52 are so distributed that one pole passes each magnet 54 during each impulse. If the motor 49 is driving the drum 23 at synchronous speed the alternate advancing and retarding effects of the magnets 54 cancel, whereas if motor 49 tends to drive drum 23 too slow or too fast either the advancing or the retarding effect of magnets 54 predominates to maintain the drum in synchronism.

By closing switch 67 power is supplied to motor 49 in proportion to the intensity of the transmitting impulses, and the power of the eddy current motor is thereby varied in accordance with the current synchronous motor 51—54, thus more effectively holding the drum in synchronism during wide variations in the intensity of the transmitting impulses.

While I have shown for purposes of illustration, a system in which the subject-matter is sent by modulating the synchronizing pulsations it will be understood that in its broader aspect the present invention is independent of whether or not the subject-matter is transmitted by modulating these pulsations or other pulsations. For example, a second generator 6' may be connected with the plate circuit 19 through transformer 7' for producing synchronizing pulsations of different frequency, in which case the receiving apparatus is adjusted to respond to these pulsations and the pulsations produced by generator 6 have no effect upon the synchronizing apparatus owing to their different frequency. It will also be understood that this invention is applicable to multiplex systems wherein a plurality of images or signals are sent simultaneously by modulating different pulsations of different frequencies and/or heat frequencies according to the different subjects-matter respectively.

I claim:

1. In a picture transmitting system, a carrier current generator at the transmitting end, means to modulate its output in accordance with the elements of the picture to be sent, a line to carry the modulated current, means to expose a spot of a sensitive receiving film in accordance with the modulated current received from the line and means to move the receiving film in synchronism with the transmitting film, said last mentioned means having its speed determined by the carrier component of the received current.

2. The combination of signal recording means, means for driving said recording means, means for generating a sustained alternating current, means for modulating said alternating current by signal currents, and means for utilizing said modulated currents to control the operation of said driving means and to control the operation of said signal reproducing means.

3. In radiographic apparatus, the method of operation, which consists in transmitting in a given interval a complete image of a given view by means of a plurality of signals of predetermined duration each controlled by a corresponding small area of said view, receiving said signals and applying energy responsive to said signals repeatedly during said interval to control the speed of a motor.

4. In a signaling system, the method of operation, which consists in the producing, at a transmitting station, of picture signals; producing also, at said station, additional signals having characteristics differing from those of the picture signals and which alternate with the picture signals; transmitting and receiving both classes of signals and applying both said classes of signals and simultaneously synchronizing and recording a picture at a receiving station.

5. In a signaling system, the method of operation, which consists in the producing, at a transmitting station, of picture signals in determinate sequence, producing additional signals at the same sequence, the said additional signals having characteristics differing from those of the picture signals, transmitting and receiving said signals, and applying both classes of signals for simultaneously synchronizing and recording a picture at a receiving station.

6. In a signaling system, the method of operation, which consists in receiving signals, each being derived from one of a small number of sources, successive signals being derived from corresponding successive sources, and applying said signals for synchronizing, and simultaneously recording a picture.

7. In a signaling system, the method of operation, which consists in transmitting signals successively derived from a corresponding one of a plurality of corresponding signal-control sources, and applying said signals for simultaneously synchronizing and recording a picture at a receiving station.

8. In a signaling system, the method of operation, which consists in producing a determinate number of series of signals, causing the signals of one series to alternate with the signals of correlated series, and applying the signals for simultaneously synchronizing and recording a picture at a distant station.

9. In a signaling system, the method of operation which consists in deriving signals directly from a scanned device whose image is to be transmitted, and at a distant station, applying said signals for simultaneously synchronizing and recording said image.

10. In a signaling system, the method of operation, which consists in scanning a subject whose image is to be transmitted, deriving therefrom signals of determinate duration, and controlling correlated receiving apparatus by said signals so as to record an image of said subject and simultaneously synchronize the receiving apparatus.

11. In a signaling system, the method of operation, which consists in producing in rapid succession a great plurality of multi-purpose signals of substantially equal duration, and causing said signals to actuate synchronizing and recording apparatus.

AUSTIN G. COOLEY.